(12) United States Patent
Gao

(10) Patent No.: US 7,324,708 B2
(45) Date of Patent: Jan. 29, 2008

(54) INTERPOLATION METHOD FOR DIGITAL PICTURES

(75) Inventor: Yue Gao, Beijing (CN)

(73) Assignee: Primax Electronics Ltd., Taipei (TW)

( * ) Notice: Subject to any disclaimer, the term of this patent is extended or adjusted under 35 U.S.C. 154(b) by 594 days.

(21) Appl. No.: 11/021,521

(22) Filed: Dec. 23, 2004

(65) Prior Publication Data

US 2006/0140512 A1    Jun. 29, 2006

(51) Int. Cl.
 *G06K 9/32* (2006.01)
 *G06K 9/36* (2006.01)
(52) U.S. Cl. .................................. 382/300
(58) Field of Classification Search ........... 382/162, 382/164, 165, 173, 190, 232, 233, 276, 293, 382/298, 300, 305; 358/515, 524, 525, 530; 375/240.18, 240.24, 240.25
See application file for complete search history.

(56) References Cited

U.S. PATENT DOCUMENTS

| | | | | |
|---|---|---|---|---|
| 5,848,185 A | * | 12/1998 | Koga et al. ............... | 382/173 |
| 5,850,487 A | * | 12/1998 | Takane et al. ............. | 382/298 |
| 6,400,852 B1 | * | 6/2002 | Miller et al. .............. | 382/298 |
| 6,832,009 B1 | * | 12/2004 | Shezaf et al. ............. | 382/300 |
| 2004/0228410 A1 | * | 11/2004 | Ameres et al. ......... | 375/240.18 |
| 2006/0140512 A1 | * | 6/2006 | Gao ........................... | 382/300 |

* cited by examiner

*Primary Examiner*—Amir Alavi
(74) *Attorney, Agent, or Firm*—Apex Juris, pllc; Tracy M Heims

(57) ABSTRACT

An interpolation method for processing digital pictures divides blank regions among the pixels equally into several squares. The interpolation parameter of each square corresponding to the sampling point is determined. These interpolation parameters are compressed and stored. When zooming a picture, the interpolating point is made sure to fall within a target square. The interpolation parameter is extracted according to the position of the target square. The brightness of the interpolating point is computed according to the interpolation parameter and the brightness of the sampling point.

10 Claims, 9 Drawing Sheets

| (1, 1) Pr1x1 | (2, 1) Pr2x1 | | | (3, 1) Pr3x1 | (4, 1) Pr4x1 |
|---|---|---|---|---|---|
| (1, 2) Pr1x2 | (2, 2) Pr2x2 | | | (3, 2) Pr3x2 | (4, 2) Pr4x2 |
| | | Pt1x1 Pt2x1 Pt3x1 Pt4x1 | | | |
| | | Pt1x2 Pt2x2 Pt3x2 Pt4x2 | | | |
| | | Pt1x3 Pt2x3 Pt3x3 Pt4x3 | | | |
| | | Pt1x4 Pt2x4 Pt3x4 Pt4x4 | | | |
| (1, 3) Pr1x3 | (2, 3) Pr2x3 | | | (3, 3) Pr3x3 | (4, 3) Pr4x3 |
| (1, 4) Pr1x4 | (2, 4) Pr2x4 | | | (3, 4) Pr3x4 | (4, 4) Pr4x4 |

INTERPOLATION METHOD FOR DIGITAL PICTURES

BACKGROUND OF THE INVENTION

1. Field of Invention

The invention relates to compressed storage method and, in particular, to a compressed storage method of the interpolation parameters in digital pictures.

2. Related Art

Interpolation is a way to extract the information of an intermediate point between known points in a picture. We know that a picture consists of pixels. When we magnify, shrink, or rotate a picture, the pixels are reorganized to produce new pixels. Therefore, the interpolation is used to reduce damages to the original picture due to the geometrical transformation. The interpolation method is a common method used when redistributing pixels; the purpose is to determine information of an intermediate point between known points in the picture.

Traditionally, there are many interpolation methods for processing digital pictures. The most common two high-resolution interpolation methods are the bicubic method and the bilinear method. Each pixel in the picture output by the bilinear interpolation algorithm is a result computed from four (2×2) pixels in the original picture. The bicubic interpolation algorithm is an improved method. Each pixel output by this algorithm is a result computed from sixteen (4×4) pixels of the original picture.

Although these two algorithms can achieve good effects, they are very time-consuming. They are local operations and, therefore, involve larger computation loads. The processing speed of interpolation during picture zooming is lower. Moreover, there usually involves more parameters. Thus, they require much larger storage space.

SUMMARY OF THE INVENTION

In view of the foregoing, the invention provides an interpolation method for digital pictures. An objective is to compress the interpolation parameters for storage to reduce their required storage space as well as increasing the interpolation processing speed.

To achieve the above objective, the disclosed method first divides blank region among the pixels into a plurality of squares. The interpolation paramter of each square corresponding to the sampling point is determined. These interpolation parameters are compressed and stored. When zooming a picture, the interpolating point is made sure to fall within a target square. The inerpolation parameter is extracted according to the position of the target square. The brightness of the interpolating point is computed according to the interpolation parameter and the brightness of the sampling point.

The invention provides a high-speed algorithm for executing bilinear and bicubic interpolations. The processing speed of this algorithm is very fast, close to the case of no parameter compression. Moreover, there is virtually no parameter loss. These parameters are compressed before storage. When doing interpolations, these parameters are decompressed. Therefore, the invention can greatly reduce the storage space required for the parameters.

BRIEF DESCRIPTION OF THE DRAWINGS

The invention will become more fully understood from the detailed description given hereinbelow illustration only, and thus are not limitative of the present invention, and wherein:

FIG. 6 is a schematic view of the bicubic algorithm with 4*4 square division;

FIG. 7 is a schematic view of the bicubic algorithm with 3*3 square division;

DETAILED DESCRIPTION OF THE INVENTION

Figure 1:
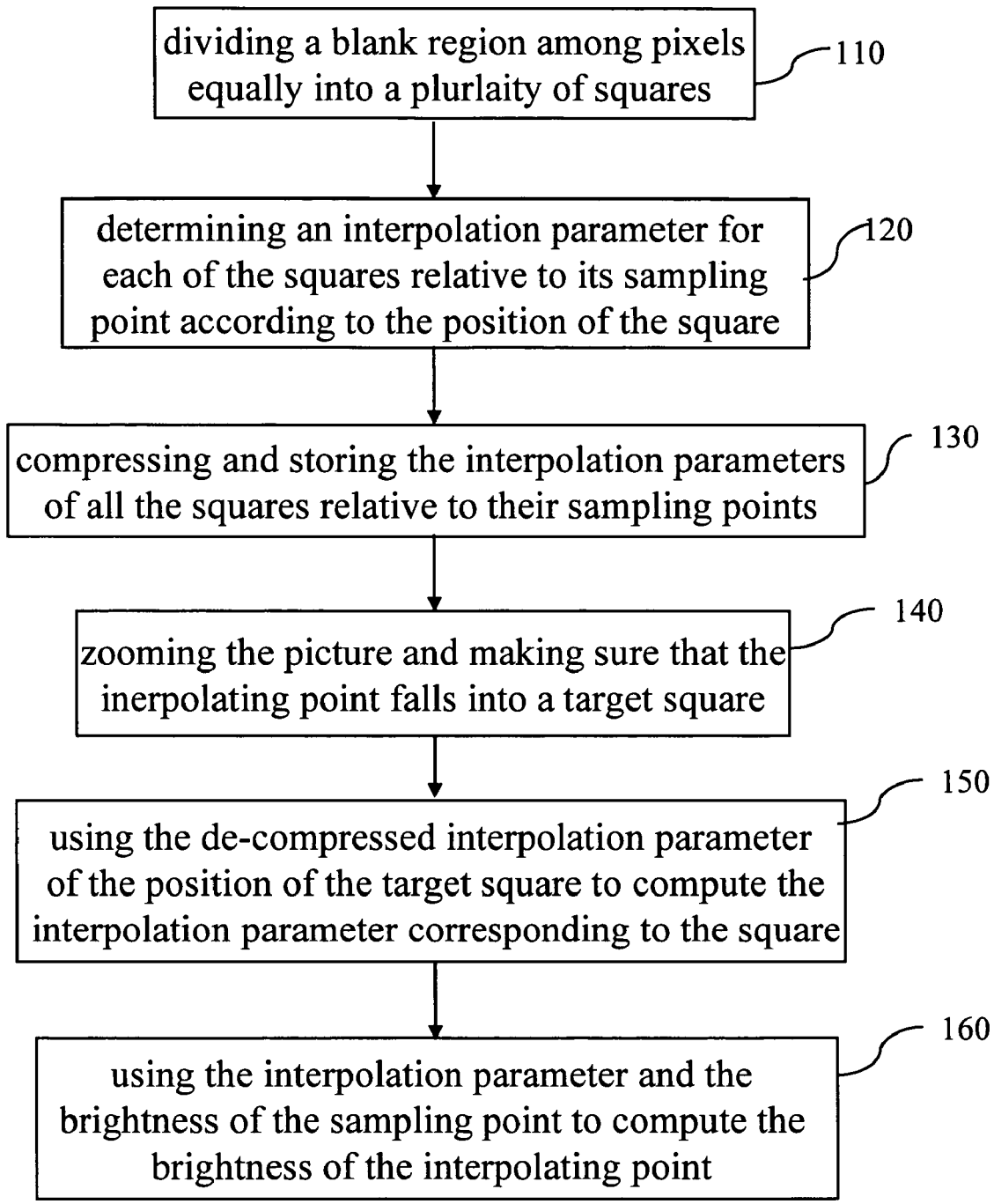
FIG. 1 is a flowchart of the disclosed interpolation method for digital pictures.

FIG. 1 shows the flowchart of the disclosed interpolation method for digital pictures. As shown in the drawing, the invention uses a high-speed interpolation algorithm. First, the blank regions among the original pixels are divided equally into several squares (step 110). The interpolation parameter corresponding to the center of each square is computed in advance. The interpolation parameter is applied to all points in the square (step 120). These interpolation parameters are compressed and stored (step 130). When interpolating, one only needs to determine the square where the interpolating point falls (step 140). After decompressing the interpolation parameter of the square (step 150), the interpolation calculation is done according to the interpolation parameter and the brightness of the sampling point (step 160). Therefore, the invention can increase the interpolation speed as well as reducing the storage space of the interpolation parameters.

Figure 2:
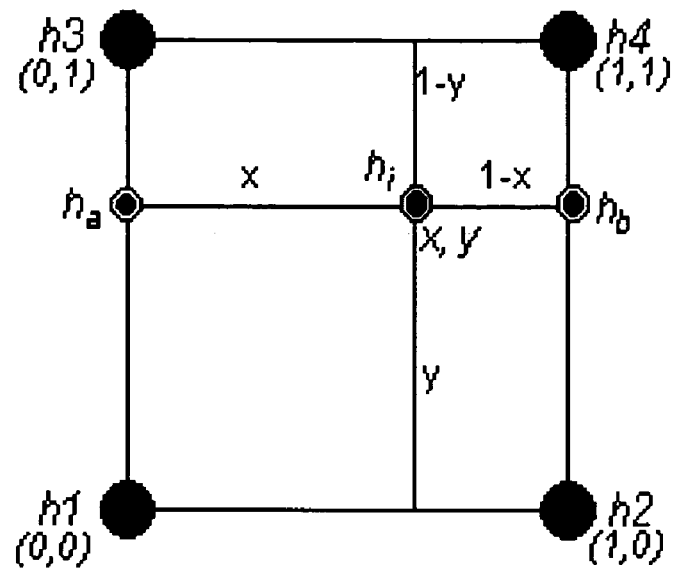
FIG. 2 is a schematic view of the bilinear inerpolation algorithm.

Please refer to FIG. 2 for the derivation of the bilinear interpolation method. The bilinear interpolation makes use of the four adjacent pixels h1, h2, h3, and h4 of the point (x,y) and assumes the brightness function in the neighborhood is linear. For example, suppose hi has the values of x,y. ha can be interpolated between h1 and h3 in the y direction of the vertical boundary of the blank region. Likewise, hb is interpolated between h2 and h4. In the x direction, an interpolation can be made between ha and hb.

The bilinear function is similar to a hyperbolic curve at the four vertices of the blank square region 10. It is usually written as:

$$h_i = a_{00} + a_{10}x + a_{01}y + a_{11}xy$$

Therefore, one obtains $$a_{00} = h1$$

$$a_{10} = h2 - h1$$

$a_{01} = h3 - h1$ $a_{11} = h1 - h2 - h3 + h4$

As a result, $hi = h1*c1 + h2*c2 + h3*c3 + h4*c4$

Figure 3:
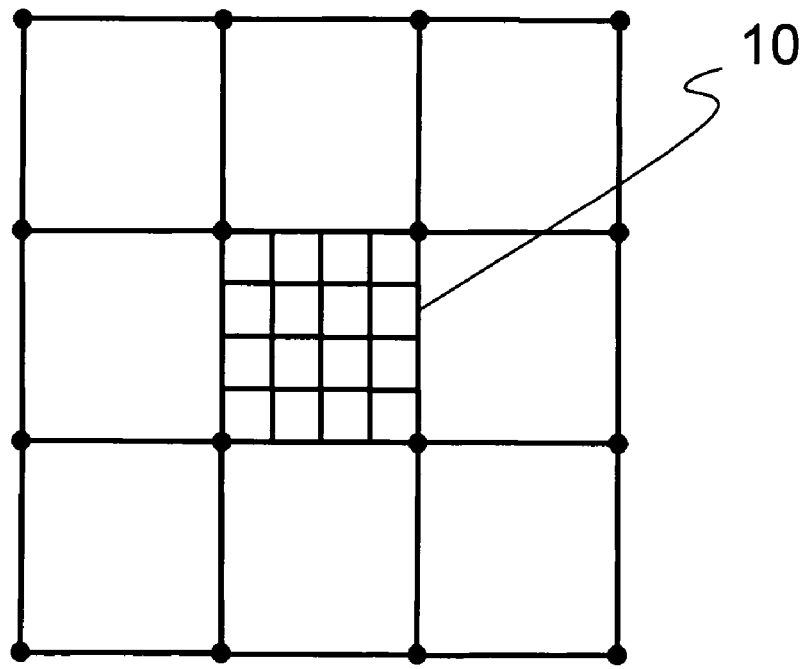
FIG. 3 is a schematic view of square division in the blank region according to the invention.
Figure 4:
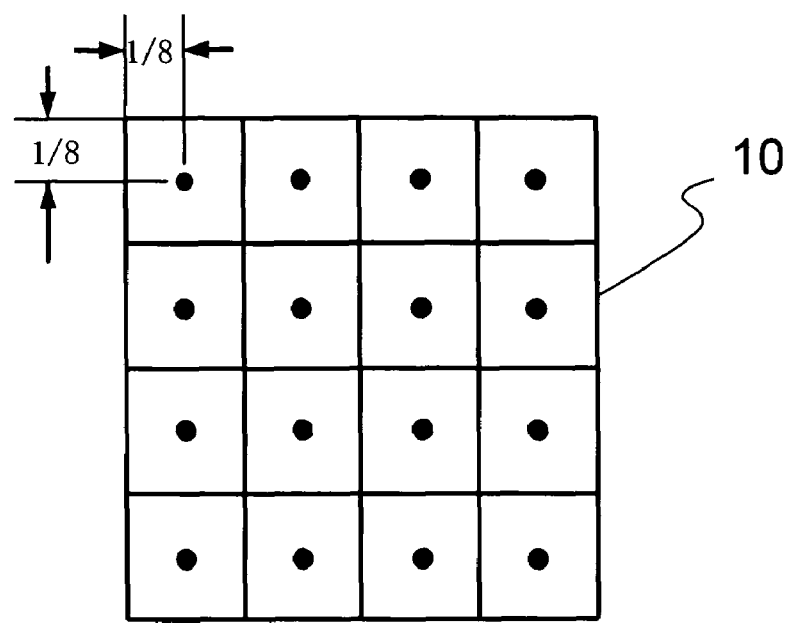
FIG. 4 is a schematic view of the interpolating point in the blank region.

The interpolation parameters are thus $c1 = 1 - x - y + xy$ $c2 = x - xy$ $c3 = y - xy$ $c4 = xy$ It is seen that the value of hi is determined by its adjacent pixels h1, h2, h3, and h4 and the interpolation parameters of each pixel. The interpolation parameters c1, c2, c3, and c4 are determined by the position (x,y). As shown in FIG. 3, Pt are the squares in the blank region 10 among the pixels. The interpolation parameter of the square is Pr. For the convenience of computation, the blank region 10 is divided into 4*4 squares Pt. The magnified view of the 4*4 squares Pt is shown in FIG. 4. The blank region 10 can be also divided into 2*2 or 3*3 squares, each of which has the same interpolation parameters (c1,c2,c3,c4).

One then picks a point in the square. The interpolation parameters c1,c2,c3.c4 of the point (⅛, ⅛) are used as the interpolation parameters of the whole square. Explicitly, C1=⁴⁹⁄₆₄, c2=⁷⁄₆₄, c3=⁷⁄₆₄, c4=¹⁄₆₄.

Figure 5:
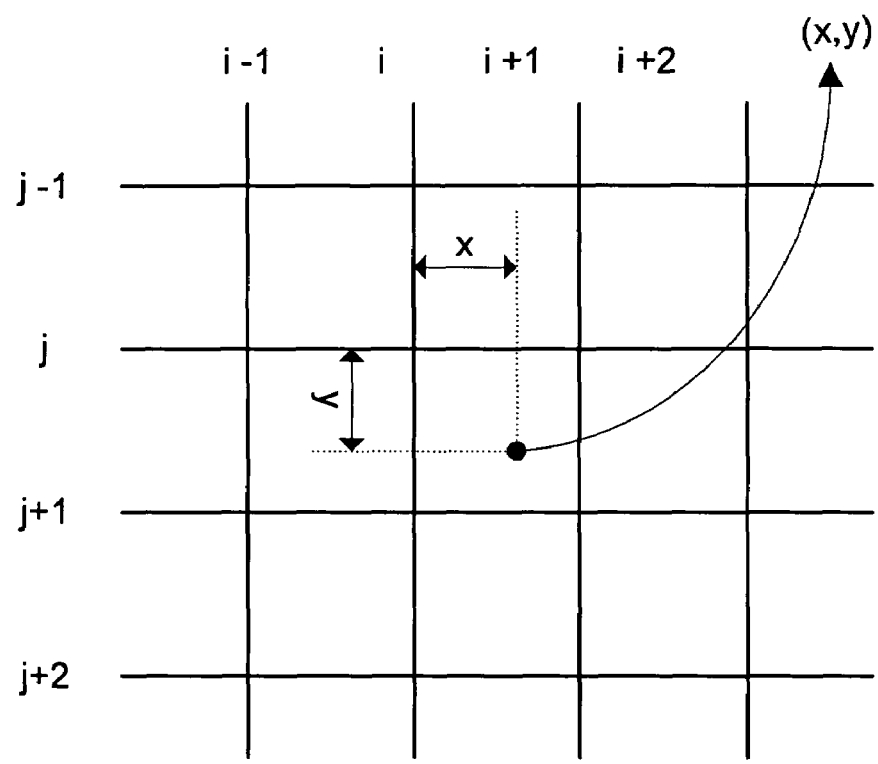
FIG. 5 is a schematic view of the coordinate of the interpolating point in the blank region.

The bicubic interpolation method is illustrated in FIG. 5. The point (x,y) is defined as the mapping point from the orignal picture to the target picture, i.e. the interpolating point. Moreover, $0 \leq x < 1$, $0 \leq y < 1$. The adjacent sixteen pixels are:

(i−1, j−1), (i, j−1), (i+1, j−1), (i+2, j−1),
(i−1, j), (i, j), (i+1, j), (i+2, j),
(i−1, j+1), (i, j+1), (i+1, j+1), (i+2, j+1),
(i−1, j+2), (i, j+2), (i+1, j+2), (i+2, j+2)

Suppose h(x,y) gives the RGB values of the pixel (x,y), then one has:

$$h(x, y) = h(i-1, j-1)*c00 + h(i, j-1)*c01 + h(i+1, j-1)c02 +$$
$$h(i+2, j-1)*c03 + h(i-1, j)*c10 + h(i, j)*c11 + h(i+1, j)c12 +$$
$$h(i+2, j-1)*c13 + h(i-1, j+1)*c20 + h(i, j+1)*c21 +$$
$$h(i+1, j+1)c22 + h(i+2, j+1)*c23 + h(i-1, j+2)*c30 +$$
$$h(i, j+2)*c31 + h(i+1, j+2)c32 + h(i+2, j+2)*c33$$

where $cij (0 \leq i \leq 3, 0 \leq j \leq 3)$ are the interpolation parameters.

As in the bilinear interpolation method, each blank region is divided into 4*4, 3*3, or 2*2 squares. Each square has the same interpolation parameters.

For example, the interpolation parameters $cij (0 \leq i \leq 3, 0 \leq j \leq 3)$ of all points in the square Pt are the same as those of the central point (⅛, ⅛) of the square. The brightness of any point is determined using all the sixteen interpolation parameters of this point and the brightness of its adjacent 16 sampling points to obtain the weighted sum and interpolating values.

More parameters need to be stored if there is no compression. As shown in FIG. 6, the embodiment uses the bicubic interpolation algorithm and divides the blank region into 4*4 squares. The interpolation parameters are the weights of its adjacent 16 points (such as the blank region in the middle of the drawing). The blank region 10 is divided into 16 squares Pt. Each square corresponding to its 16 adjacent pixels (sampling points) has 16 interpolation parameters. Therefore, there are totally 16×16=256 interpolation paramters for the 16 squares to be stored.

Figure 7:
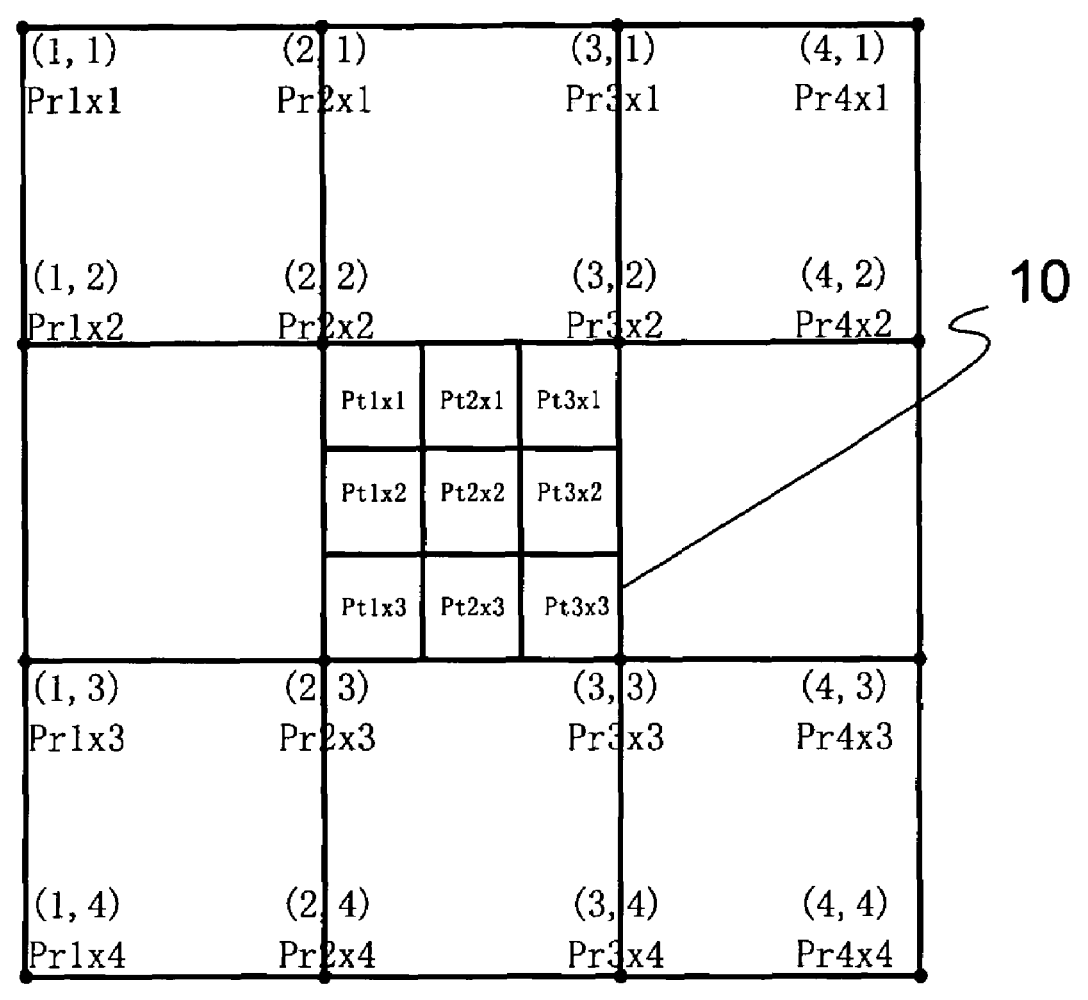

As shown in FIG. 7, this embodiment adpots the bicubic algorithm and divides a blank region into 3*3 squares. The interpolation parameters are the weights of its adjacent 16 points (such as the blank region in the middle of the drawing). The blank region 10 is divided into 3*3 squares Pt. Each square has 16 parametes corresponding to its 16 sampling points. Therefore, there are totally 9×16=144 interpolation paramters for the 9 squares to be stored.

Figure 8:
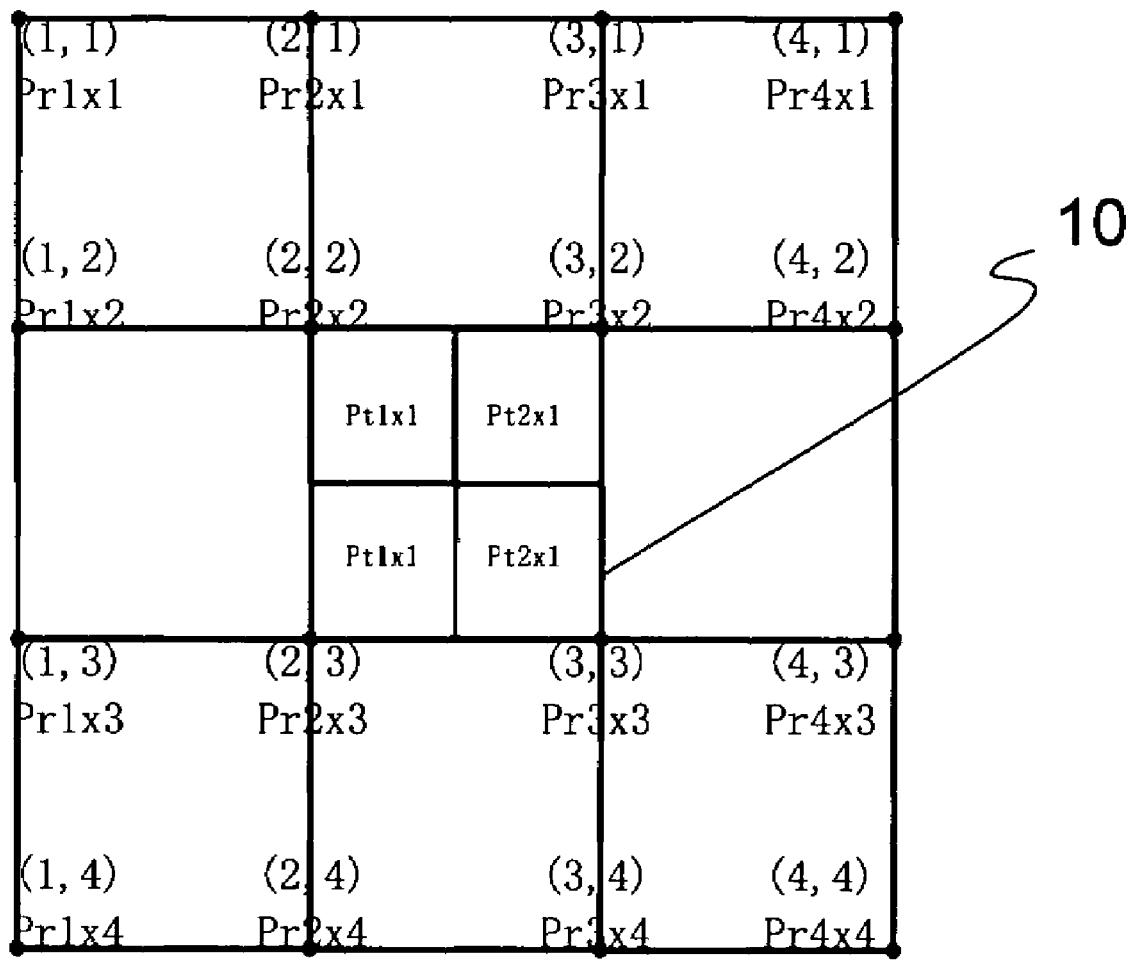
FIG. 8 is a schematic view of the bicubic algorithm with 2*2 square division.

As shown in FIG. 8, this embodiment adpots the bicubic algorithm and divides a blank region into 2*2 squares. The interpolation parameters are the weights of its adjacent 16 points (such as the blank region in the middle of the drawing). The blank region 10 is divided into 2*2 squares Pt. Each square has 16 parametes corresponding to its 16 sampling points. Therefore, there are totally 4×16=64 interpolation paramters for the 4 squares to be stored.

Figure 9:
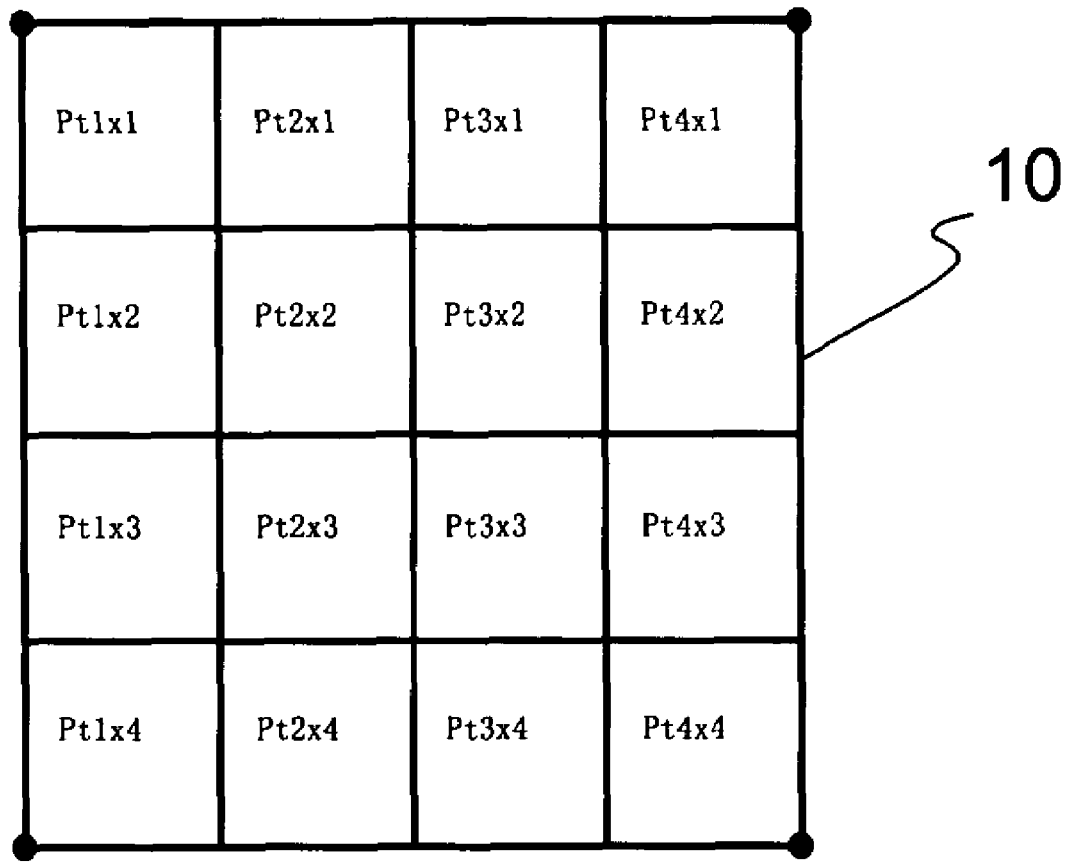
FIG. 9 is a schematic view of the bilinear algorithm with 4*4 square division.

As shown in FIG. 9, this embodiment adopts the bilinear algorithm and divides a blank region into 4*4 squares. The interpolation parameters are the weights of its adjacent 4 points. Each square has 4 parametes corresponding to its 4 sampling points. Therefore, there are totally 4×16=64 interpolation paramters for the 16 squares to be stored.

Figure 10:
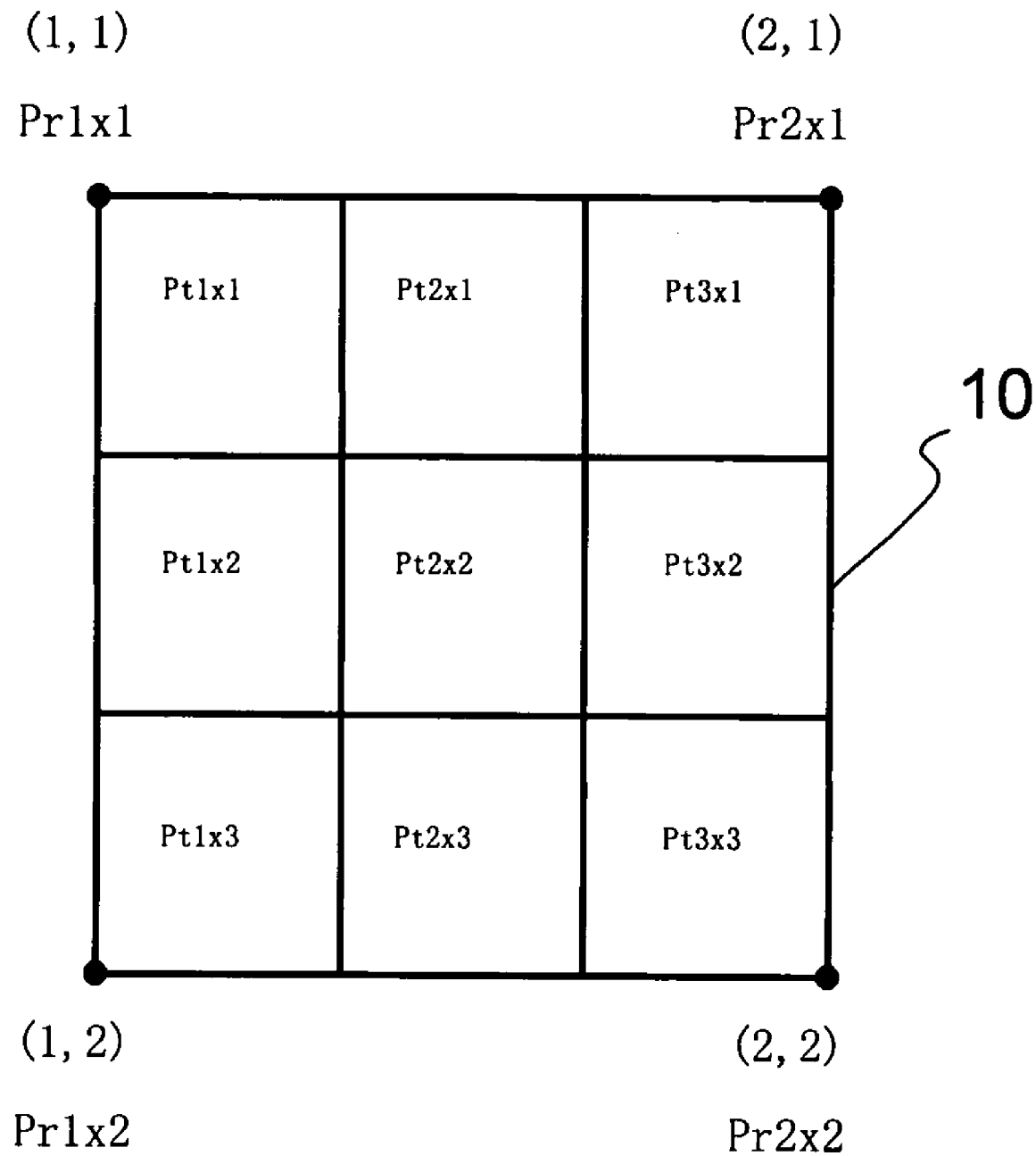
FIG. 10 is a schematic view of the bilinear algorithm with 3*3 square division.

As shown in FIG. 10, this embodiment adopts the bilinear algorithm and divides a blank region into 3*3 squares. The interpolation parameters are the weights of its adjacent 4 points. Each square has 4 parametes corresponding to its 4 sampling points. Therefore, there are totally 4×9=36 interpolation paramters for the 9 squares to be stored.

Figure 11:
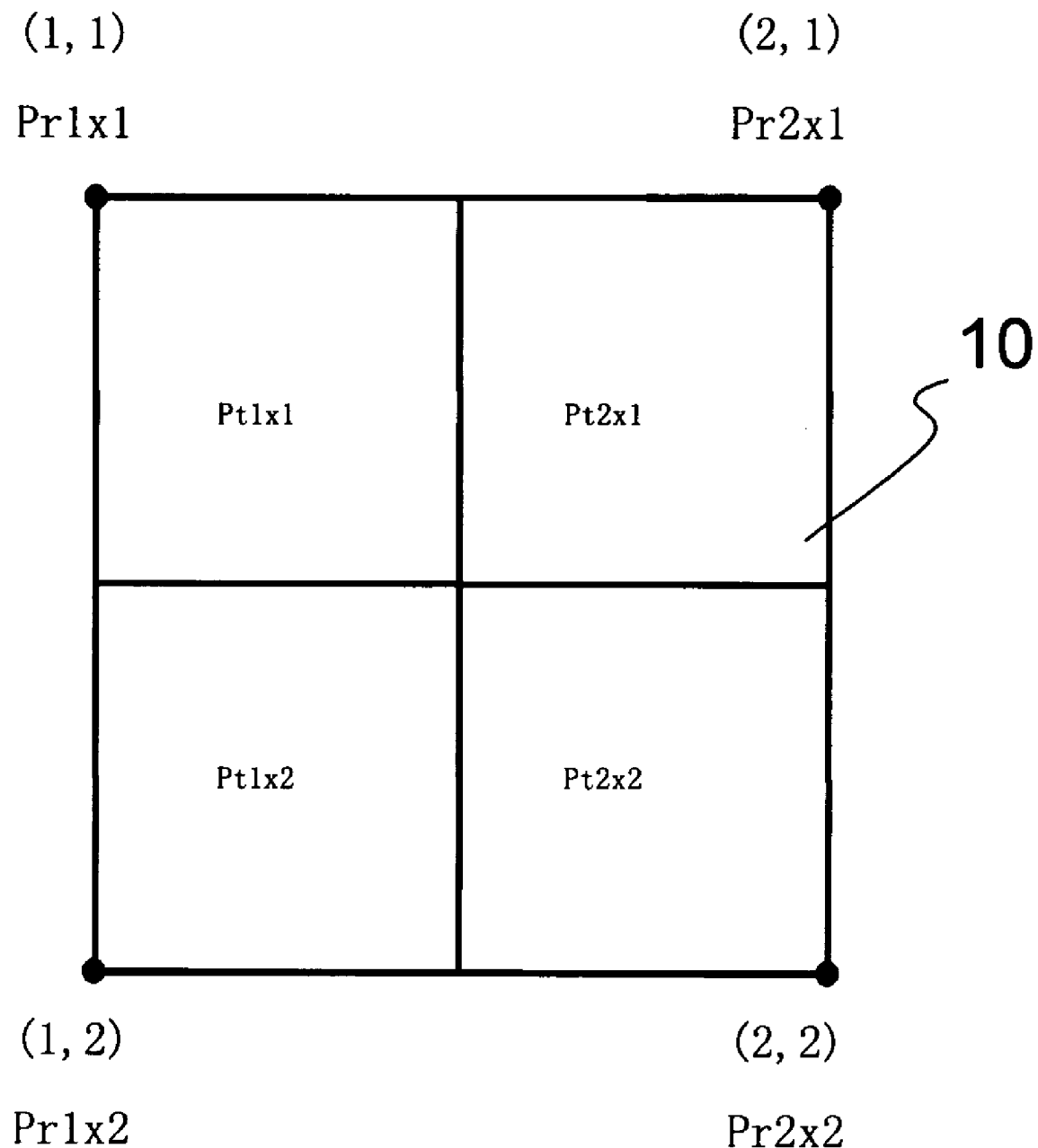
FIG. 11 is a schematic view of the bilinear algorithm with 2*2 square division.

As shown in FIG. 11, this embodiment adopts the bilinear algorithm and divides a blank region into 2*2 squares. The interpolation parameters are the weights of its adjacent 4 points. Each square has 4 parametes corresponding to its 4 sampling points. Therefore, there are totally 4×4=16 interpolation paramters for the 4 squares to be stored.

The invention compresses the interpolation parameters to be stored. For the bicubic interpolation algorithm on the 16 squares shown in FIG. 6, we have:

Suppose C11 is the 4*4 interpolation parameter matrix coresponding to the point (1,1), then it contains 16 interpolation parameters. C11 (i,j) (0<=i<=3, 0<=j<=3) are the interpolation parameters of the (i,j) square corresponding to the point (1,1).

Suppose C21 is the 4*4 interpolation parameter matrix coresponding to the point (2,1), then it contains 16 interpolation parameters. C21 (i,j) (0<=i<=3, 0<=j<=3) are the interpolation parameters of the (i,j) square corresponding to the point (2,1).

Suppose C31 is the 4*4 interpolation parameter matrix coresponding to the point (3,1), then it contains 16 interpolation parameters. C31 (i,j) (0<=i<=3, 0<=j<=3) are the interpolation parameters of the (i,j) square corresponding to the point (3,1).

Suppose C41 is the 4*4 interpolation parameter matrix coresponding to the point (4,1), then it contains 16 interpolation parameters. C41 (i,j) (0<=i<=3, 0<=j<=3) are the interpolation parameters of the (i,j) square corresponding to the point (4,1).

Suppose C12 is the 4*4 interpolation parameter matrix coresponding to the point (1,2), then it contains 16 interpolation parameters. C12 (i,j) (0<=i<=3, 0<=j<=3) are the interpolation parameters of the (i,j) square corresponding to the point (1,2).

Suppose C22 is the 4*4 interpolation parameter matrix coresponding to the point (2,2), then it contains 16 interpolation parameters. C22 (i,j) (0<=i<=3, 0<=j<=3) are the interpolation parameters of the (i,j) square corresponding to the point (2,2).

Suppose C32 is the 4*4 interpolation parameter matrix coresponding to the point (3,2), then it contains 16 interpolation parameters. C32 (i,j) (0<=i<=3, 0<=j<=3) are the interpolation parameters of the (i,j) square corresponding to the point (3,2).

Suppose C42 is the 4*4 interpolation parameter matrix coresponding to the point (4,2), then it contains 16 interpolation parameters. C42 (i,j) (0<=i<=3, 0<=j<=3) are the interpolation parameters of the (i,j) square corresponding to the point (4,2).

Suppose C13 is the 4*4 interpolation parameter matrix coresponding to the point (1,3), then it contains 16 interpolation parameters. C13 (i,j) (0<=i<=3, 0<=j<=3) are the interpolation parameters of the (i,j) square corresponding to the point (1,3).

Suppose C23 is the 4*4 interpolation parameter matrix coresponding to the point (2,3), then it contains 16 interpolation parameters. C23 (i,j) (0<=i<=3, 0<=j<=3) are the interpolation parameters of the (i,j) square corresponding to the point (2,3).

Suppose C33 is the 4*4 interpolation parameter matrix coresponding to the point (3,3), then it contains 16 interpolation parameters. C33 (i,j) (0<=i<=3, 0<=j<=3) are the interpolation parameters of the (i,j) square corresponding to the point (3,3).

Suppose C43 is the 4*4 interpolation parameter matrix coresponding to the point (4,3), then it contains 16 interpolation parameters. C43 (i,j) (0<=i<=3, 0<=j<=3) are the interpolation parameters of the (i,j) square corresponding to the point (4,3).

Suppose C14 is the 4*4 interpolation parameter matrix coresponding to the point (1,4), then it contains 16 interpolation parameters. C14 (i,j) (0<=i<=3, 0<=j<=3) are the interpolation parameters of the (i,j) square corresponding to the point (1,4).

Suppose C24 is the 4*4 interpolation parameter matrix coresponding to the point (2,4), then it contains 16 interpolation parameters. C24 (i,j) (0<=i<=3, 0<=j<=3) are the interpolation parameters of the (i,j) square corresponding to the point (2,4).

Suppose C34 is the 4*4 interpolation parameter matrix coresponding to the point (3,4), then it contains 16 interpolation parameters. C34 (i,j) (0<=i<=3, 0<=j<=3) are the interpolation parameters of the (i,j) square corresponding to the point (3,4).

Suppose C44 is the 4*4 interpolation parameter matrix coresponding to the point (4,4), then it contains 16 interpolation parameters. C44 (i,j) (0<=i<=3, 0<=j<=3) are the interpolation parameters of the (i,j) square corresponding to the point (4,4).

For the bicubic interpolation algorithm with 4*4 squares, one has to store 16 matrix parameters that satisfy the following rules:

$$C31(i,j)=C21(i, 3-j);$$

$$C41(i,j)=C11(i, 3-j);$$

$$C32(i,j)=C22(i, 3-j);$$

$$C42(i,j)=C12(i, 3-j);$$

$$C13(i,j)=C12(3-i, j);$$

$$C23(i,j)=C22(3-i, j);$$

$$C33(i,j)=C22(3-i,3-j);$$

$$C43(i,j)=C12(3-i,3-j);$$

$$C14(i,j)=C11(3-i, j);$$

$$C24(i,j)=C21(3-i, j);$$

$$C34(i,j)=C21(3-i,3-j);$$

$$C44(i,j)=C11(3-i,3-j).$$

Therefore, C31(i,j), C41(i,j), C32(i,j), C42(i,j), C13(i,j), C23(i,j), C33(i,j), C43(i,j), C14(i,j), C24(i,j), C34(i,j), and C44(i,j) can be obtained from C11(i,j), C21(i,j), C12(i,j), and C22(i,j).

For C11(i,j), C11(i,j)=C11(j,i) (0<=i<=3, 0<=j<=3). Therefore, only 10 of C11's 16 parameters needs to be stored. The others can be obtained by calculation.

C22(i,j)=C22(j,i) (0<=i<=3, 0<=j<=3). Therefore, only 10 of C11's 16 parameters needs to be stored. The others half can be obtained by calculation.

C12(i,j)=C21(j,i) (0<=i<=3, 0<=j<=3). Therefore, only C12 needs to be stored. C21 can be obtained from C12.

One thus only needs to store a part of the elements in C11, C12, C21, and C22. All the other inerpolation parameters C11, C21, C31, C41, C12, C22, C32, C42, C13, C23, C33, C43, C14, C24, C34, C44 can be derived from them. Therefore, the largest compression rate is close to 8:1. Likewise, the bicubic algorithm with 3×3 and 2×2 square divisions will give the similar compression rate.

For the bilinear interpolation algorithm on the 16 squares shown in FIG. 9, we have:

Suppose C11 is the 4×4 parameter matrix of the point (1,1). It includes 16 parameters. C11(i,j) (0<=i<=3, 0<=j<=3) is the interpolation parameter of the (i,j) square at point (1,1).

Suppose C21 is the 4×4 parameter matrix of the point (2,1). It includes 16 parameters. C21(i,j) (0<=i<=3, 0<=j<=3) is the interpolation parameter of the (i,j) square at point (2,1).

Suppose C12 is the 4×4 parameter matrix of the point (1,2). It includes 16 parameters. C12(i,j) (0<=i<=3, 0<=j<=3) is the interpolation parameter of the (i,j) square at point (1,2).

Suppose C22 is the 4×4 parameter matrix of the point (2,2). It includes 16 parameters. C22(i,j) (0<=i<=3, 0<=j<=3) is the interpolation parameter of the (i,j) square at point (2,2).

For the bilinear interpolation with 4×4 squares, one needs the 4 matrices of the above parameters.

The 4 matrix parameters satisfy the following rules:

$$C21(i,j)=C11(3-i,j);$$

$$C12(i,j)=C11(i,3-j);$$

$$C22(i,j)=C11(3-i,3-j);$$

Therefore, C21(i,j) C12(i,j) C22(i,j) can be obtained from C11(i,j).

For C11(I,j), C11(i,j)=C11(j,i) (0<=i<=3, 0<=j<=3). Therefore, only 10 of C11's 16 parameters need to be stored. The others can be obtained by calculation.

One thus sees that only a part of the C11 elements are needed to obtain all of the interpolation parameters C11, C21, C12, C22. The largest compression rate is close to 8:1. Likewise, the 3×3 and 2×2 square divisions also have the similar compression rate.

Certain variations would be apparent to those skilled in the art, which variations are considered within the spirit and scope of the claimed invention.

What is claimed is:

1. An interpolation method for digital pictures, comprising the steps of:

dividing a blank region among pixels equally into a plurality of squares;

determining an interpolation parameter for each of the squares relative to its sampling point according to the position of the square;

compressing and storing the interpolation parameters of all the squares relative to their sampling points;

zooming the picture and making sure that the inerpolating point falls into a target square;

de-compressing the interpolation parameters according to the position of the target square and computing the interpolation parameter corresponding to the square; and using the interpolation parameters and the brightness of the sampling points to compute the brightness of the interpolating point.

2. The interpolation method of claim 1, wherein the step of dividing a blank region among pixels equally into a plurality of squares divides the blank region into 4*4=16 squares.

3. The interpolation method of claim 1, wherein the step of dividing a blank region among pixels equally into a plurality of squares divides the blank region into 3*3=9 squares.

4. The interpolation method of claim 1, wherein the step of dividing a blank region among pixels equally into a plurality of squares divides the blank region into 2*2=4 squares.

5. The interpolation method of claim 1, wherein the interpolation parameter of each square is the interpolation parameter of the center of each square.

6. The interpolation method of claim 1, wherein the number of sampling points is 4.

7. The interpolation method of claim 1, wherein the number of sampling points is 16.

8. The interpolation method of claim 1, wherein the step of compressing and storing the interpolation parameters of all the squares relative to their sampling points further comprises the steps of:

determining the interpolation parameters of each square relative to its adjacent four sampling points; and compressing and storing the interpolation parameters according to the coordinates of the interpolation parameters.

9. The interpolation method of claim 1, wherein brightness at the interpolating point is computed using the bicubic algorithm.

10. The interpolation method of claim 1, wherein brightness at the interpolating point is computed using the bilinear algorithm.

* * * * *